Figure 1:
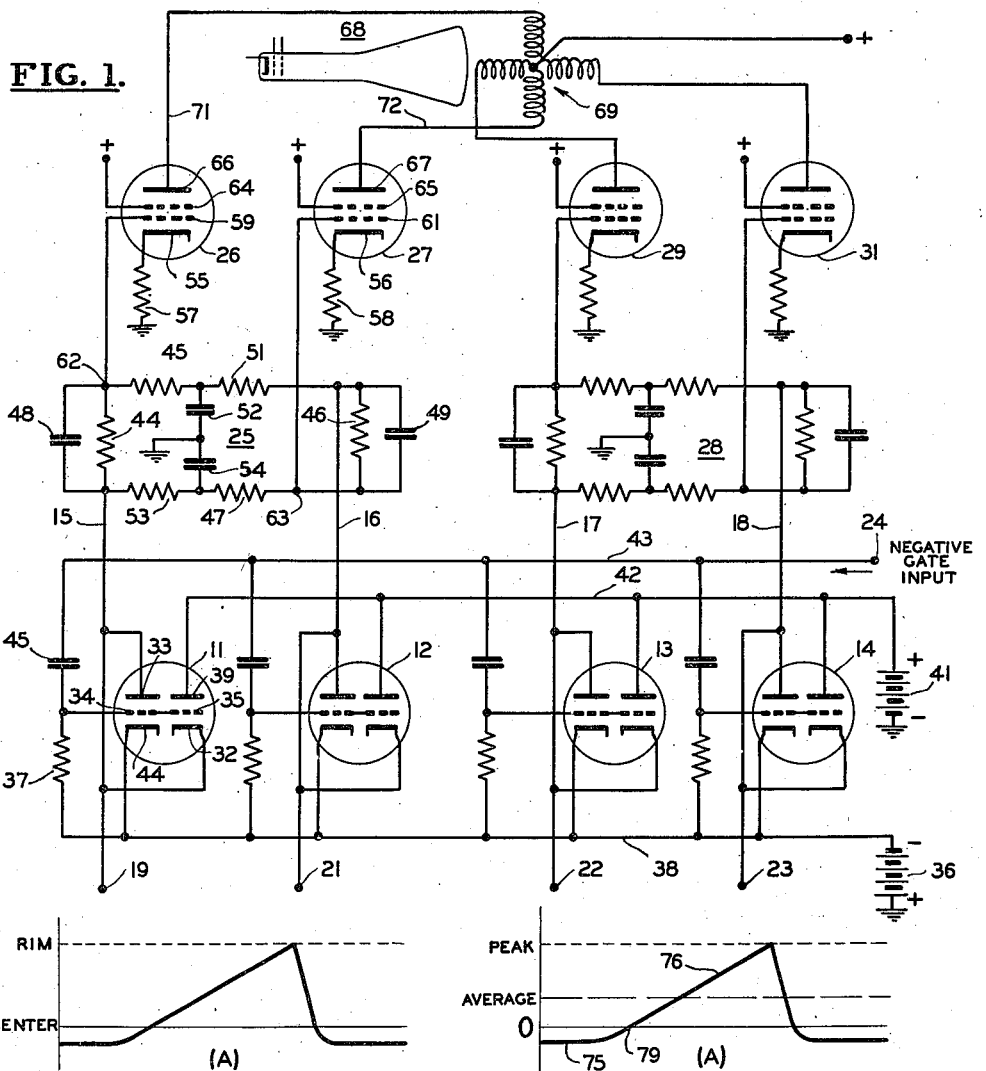

April 12, 1949.  D. E. KENYON  2,466,712

SWEEP CIRCUIT

Filed Feb. 16, 1944

INVENTOR
DAVID E. KENYON
BY Paul B. Hunter
ATTORNEY

Patented Apr. 12, 1949

2,466,712

UNITED STATES PATENT OFFICE 2,466,712

SWEEP CIRCUIT

David E. Kenyon, Smithtown, N. Y., assignor to The Sperry Corporation, a corporation of Delaware Application February 16, 1944, Serial No. 522,605

9 Claims. (Cl. 315—26)

My invention relates to sweep circuits generally and more specifically to radial sweep circuits.

In many types of oscilloscopic indication, it is advantageous to employ a radial sweep. For example, in plan position indication, as applied to radar, the screen of an oscilloscope's cathode ray tube is used to indicate the plan position of a target and the distance from the center of the tube at which the signal appears gives an indication of target range. To effect such an indication, a time base sweep is used which originates at the center of the tube screen and sweeps radially to its rim, depending upon the azimuth position of the system's scanner. Such a sweep may be produced by applying a plurality of sweeps to the tube's deflection system in the following manner. Suitable sawtooth sweep voltages are fed to the tube's vertical deflecting system which are equal in magnitude but opposite in sign. Similar sweeps are placed on the horizontal deflecting system and, since the envelopes of the sweeps are sinusoidal functions of any scanner position and since a 90° phase relation with respect to scanner position obtains between them, a position indication results.

A further requirement for this type of indication is that both of the sweeps applied to each set of deflecting elements must start at the same time. Bearing this requirement in mind and also the fact that the distance from the center of the tube at which the signal is received is a measure of range, it is obvious that accurate control of the start of the sweep with respect to the center of the tube's screen is desirable. It is with such control that the instant invention is concerned and, although the problem has been presented with regard to plan position indication, it is to be understood that the application of my invention is not to be limited thereto but that the same is to be considered in its broadest aspects as including sweep voltage control.

Accordingly, it is an object of my invention to provide apparatus for and methods of producing an improved sweep voltage.

It is also a purpose of my invention to provide a method and apparatus for improving the linearity of a radial sweep in the vicinity of its origin.

Another object of my invention is to provide a radial sweep circuit with control means for starting the sweep at the center of a cathode ray tube screen.

Further, as an object of my invention, I wish to provide a sweep circuit in which a plurality of sweep amplifiers are subject to inter-control through the action of a linear passive network.

A further object of my invention is attained by a novel arrangement of a plurality of sweep amplifiers, and a plurality of clamping circuits in such manner that a passive network may be interposed between the clamping tubes and the sweep amplifiers to place an automatically controlled bias on the grid of each amplifier which is proportional to the sweep voltage applied to another amplifier served by said passive network.

Yet another object of my invention is to provide a sweep circuit in which a number of sweep voltages are passed by suitable clamping circuits to a series of sweep amplifiers which are automatically biased by contrariwise connected networks comprising dual voltage dividers and filters.

Other objects and advantages of my invention will become apparent as the description proceeds.

In carrying out my invention in a preferred embodiment thereof, I provide four amplifier tubes which are connected in a suitable manner to the deflecting system of a cathode ray tube. Sweep voltages in the form of sawtooth waves are applied to each of these tubes in a unique manner which controls the direct current level of the signal appearing on the grid electrode of each amplifier. Two of the sweeps which are equal in magnitude, but opposite in sign, are applied to the vertical deflecting amplifiers and two of similar characteristics, but with their envelopes displaced 90°, to the horizontal amplifiers. The sweeps are each fed from their source to separate clamping circuits which are controlled by a gating voltage to maintain the potential of four points within the circuit at a common fixed value at the start of each sweep. From these points the two voltages forming the vertical sweep are passed through a biasing network to the respective grids of the vertical amplifiers and thence to the tube's deflecting system. Similarly, the horizontal sweeps are passed for amplification through a biasing network. Both of the biasing branches of the circuit operate to bias the grid of one of the amplifiers, which is served by the biasing network, with a voltage which is proportional to the amplitude of the sweep appearing on the grid of the other amplifier. In this manner, a radial sweep is supplied to the deflecting system of the cathode ray tube whose point of origin and whose linearity in that vicinity are controlled.

Figure 2:
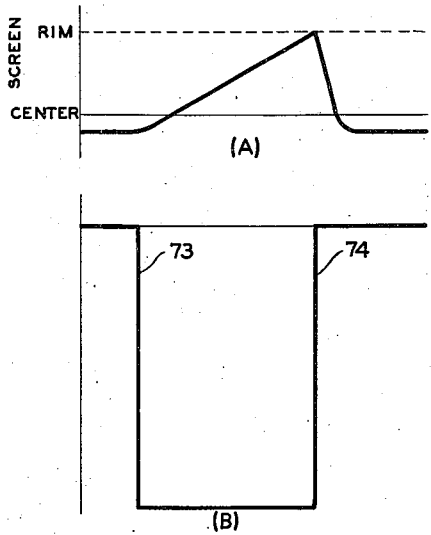
Figure 3:
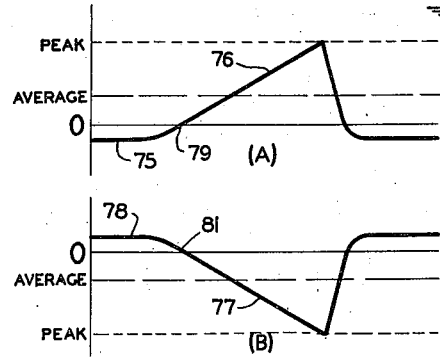

A more comprehensive understanding of my invention will be afforded from the following detailed description when considered in conjunction with the accompanying drawing in which Fig. 1 is a schematic diagram of a sweep circuit embodying my invention;

Fig. 2 is a graphical representation of a typical time base sweep supplied to the circuit of Fig. 1, showing its relationship to the dimensions of a cathode ray tube screen and to a gating voltage applied to the clamping circuits thereof; and Fig. 3 is a graphical representation of the vertical sweeps showing the effects of automatic biasing.

In the circuit illustrated in Fig. 1, I provide four electronic discharge devices 11, 12, 13 and 14, which are connected as clamping tubes and which operate to clamp the points 15, 16, 17 and 18 at a common fixed potential at the start of a series of sawtooth sweeps applied on the input terminals 19, 21, 22 and 23. The negative gating voltage which controls the clamping tubes 11, 12, 13 and 14 is applied to the circuit at terminal 24. From the points 15 and 16, the vertical sweeps are passed through a linear passive network 25 to their respective amplifiers 26 and 27, which are illustrated as tetrodes. Similarly, the sweep voltages at points 17 and 18 pass the network 28 and are amplified by their respective amplifiers 29 and 31. The networks 25 and 28 modify the direct current level of the sweep voltages applied to the elements 26, 27, 29 and 31 and thus control their starting point.

Since the circuit illustrated in the figure is symmetrical with respect to the vertical and horizontal sweeps, the description will be limited to the former only, it being understood that the circuit connections and operation of the latter are substantially the same.

Each of the twin electronic discharge devices 11 and 12 are connected as "clampers" and, with reference to device 11, may be considered as being two triodes of which the cathode 32 of one is connected to the plate 33 of the other. The grids 34 and 35 are tied together and receive a negative gating voltage from terminal 24. Also, they are connected to source 36 through a resistor 37, a common bus 38 serving all of the clampers 11, 12, 13 and 14. In like manner, a positive voltage is supplied to the plates of all of the clamping tubes, corresponding to plate 39 of tube 11, from source 41 by a common lead 42, and a gating voltage from terminal 24 to the grids of all tubes by line 43. Cathode 44 of tube 11 is directly connected to line 38 as are the corresponding electrodes of the other clamping tubes. Isolating condensers, such as 45 in the grid circuit of tube 11, are also provided for each clamper.

Under the control of the clamping tubes 11, 12, 13 and 14, the sweeps appearing on terminals 19, 21, 22 and 23 are respectively "clamped" at a fixed potential at the beginning of each sweep. From the points of common fixed potential 15, 16, 17 and 18, the sweeps are passed to the networks 25 and 28.

Network 25, which controls the direct current level on the grids of vertical amplifiers 26 and 27, is made up of two voltage dividers and two direct current pass filters contrariwise connected. Resistors 44 and 45, together with capacitor 52, comprise a voltage divider for the sweep from point 15, and resistors 46 and 47, with capacitor 54, form a similar device for the sweep from point 16. Capacitors 48 and 49 are connected across the resistors 44 and 46, respectively, and serve to pass the alternating components of the sweep voltages on terminals 19 and 21. Resistor 51 and capacitor 52, connected in the network as shown, act as a direct current pass filter for the sweep from terminal 21, and similar elements 53 and 54 perform a like function for the sweep on terminal 19.

Vertical amplifiers 26 and 27 have their respective electrodes connected as shown. Cathodes 55 and 56 are connected to ground through cathode resistors 57 and 58, and grids 59 and 61 to the passive network 25 at points 62 and 63, respectively. Grids 59 and 61 receive sweep voltages from terminals 19 and 21, which, at convenient times, will be referred to as signal voltages to differentiate from the D. C. voltages also appearing on these electrodes. The screen grids 64 and 65 are connected to a common positive source indicated by symbol, which also supplies the corresponding electrodes of tubes 29 and 31. Plates 66 and 67 are maintained at positive potential from the deflection yokes 69 of oscilloscope 68, to which they are connected by conductors 71 and 72.

The operation of the complete circuit, including the horizontal sweep section which comprises the clampers 13 and 14, the passive network 28, and the horizontal amplifiers 29 and 31 and which is connected in an identical manner to that explained for the vertical deflection section, can be visualized from the illustrations of Figs. 2 and 3.

In general, it is required to start the sawtooth sweeps at a point below their zero as shown in Fig. 2A, in order that they be linear at the start. This is particularly true where the sweep is applied to electromagnetic deflection elements, because of the impedance offered at this point of the sweep cycle. By starting the sweep below zero and adjusting it so that the center of the tube's screen will correspond to zero, the sweep will have assumed a linear state when it passes this point, its origin will be controlled, and a linear sweep will be provided between the limits of the screen's center and its rim.

Thus, when each sawtooth wave is received on its respective terminal 19, 21, 22, or 23, it is synchronized with a negative gate appearing on terminal 24 and its corresponding clamper is operated in a conventional manner, as will be explained with respect to clamping tube 11 only. When the leading edge 73 of the negative gate illustrated in Fig. 2B reaches the grids 34 and 35 of tube 11, both halves of the twin triode are driven beyond cut-off and the direct current level of point 15 is released from its fixed potential, which is common also to points 16, 17 and 18 when clamping tubes 12, 13 and 14 are in their clamped state. When in an unclamped condition, each clamping tube passes its sweep directly to the passive network which it serves. As the trailing edge 74 of the gate appears on the grids of tube 11 both halves thereof become conducting and the tube is again clamped. This latter action occurs at the start of each sweep cycle.

With the potential of points 15, 16, 17 and 18 thus fixed at the start of each sweep cycle, the A. C. components of the sweep voltages are passed to the grids of their respective amplifiers through the condensers corresponding to 48 for the sweep on terminal 19.

Through the action of resistor 51, a high resistance, and capacitor 52, having large capacitance, a voltage obtains across the latter element which is proportional to the average value, and therefore to the peak value, of the sweep voltage at point 16. Since the sweep voltage at point 16 is equal to, but opposite in sign from that of its companion sweep at point 15, a D. C. bias is applied to the grid 59 of amplifier 26 which is opposite in sign from the sweep appearing on this grid from terminal 19, but proportional to it. Similarly, and by the action of resistor 53 and capacitor 54, a biasing voltage is impressed on grid 61 of amplifier 27, which is proportional to the average and peak values of the sweep at point 15, but opposite in sign, and which is proportional to and opposite in sign as compared with the sweep voltage on grid 61 from terminal 21. The voltages on capacitors 48, 49, 52 and 54 remain substantially constant throughout a sweep cycle, but vary slowly as the average sweep amplitude changes. The voltage applied to grid 59, for example, depends chiefly on the voltages across capacitors 52 and 48, and negligibly on the voltage on capacitor 54. This is due to the fact that clamper tube 11 operates as a low-impedance source periodically to return lead 15 to a fixed value with respect to ground determined by source 36. Thus the voltage on capacitor 54 has little or no effect upon the voltage applied to grid 59.

These effects are illustrated in Fig. 3. If the sweep represented by Fig. 3A be considered as appearing on terminal 19 and that of Fig. 3B on terminal 21, it being remembered that the two sweeps are equal in amplitude, it will be seen that the trace 75 of sweep 76 is depressed below zero by virtue of the D. C. bias supplied by network 25, which is proportional to the average and peak values of sweep 77 whose initial portion of its trace 78 is elevated above zero by the same network. Since the D. C. level of points 15 and 16 are fixed at the beginning of each sweep and since the amounts of D. C. bias applied to grids 59 and 61 are governed respectively by the value of circuit parameters 44—45 and 46—47, the points 79 and 81 may be selectively controlled. Thus, it is possible to start the sweep at the center of a tube screen and to improve its linearity in this vicinity.

For sake of emphasis, it is repeated that that branch of the circuit comprising the clampers 13 and 14, the passive network 28, and the amplifiers 29 and 31, which supplies a horizontal sweep, is connected and operates in all respects as does the vertical sweep branch treated in the above description.

In regard to the circuit, generally, it may be stated that none of the parameters thereof are critical. Elements 51 and 52 and those corresponding thereto should be relatively large. Capacitors 48 and 49, and those of network 28 which correspond, pass the A. C. components of the sweeps appearing on the input terminals of the circuit and in some applications may be omitted.

It may be observed that the passive networks 25 and 28 modify and in some instances may tend to defeat the purpose of the clamper tubes 11 and 12 and 13 and 14 respectively, insofar as the latter elements control the D. C. level of the points 15, 16, 17 and 18, and it appears that the circuit would perform its desired function equally well with the latter elements removed. Practice, however, has proven the necessity of these clamping tubes for the removal of spurious retrace voltages, in the presence of which the average value of a sweep voltage has little significance and cannot be relied upon.

Modifications of my invention are of course possible, and may suggest themselves in view of the foregoing disclosure. Accordingly, the representations and descriptions herein made are to be considered as being illustrative and nowise in a restrictive sense, and my invention, both as to spirit and scope, is to be limited only by the appended claims.

What is claimed is:

1. In combination, first and second electronic discharge devices, separate terminal means for respectively impressing first and second cyclic signal voltages coupled to said electronic discharge devices, means for maintaining said terminal means at fixed potentials at the start of each signal cycle, said means comprising a normally conducting vacuum tube connected between each of said terminal means and a potential source and means for rendering said vacuum tubes non-conducting during each signal cycle, and means interposed between said terminal means and said first and second discharge devices for applying a biasing voltage to said first device which is a function of the average signal voltage on the second device and a biasing voltage to said second device which is a function of the average signal voltage on said first device.

2. A system for providing an output voltage whose alternating value is a function of a first signal voltage and whose direct value is a function of a second signal voltage, comprising: a network comprising a capacitance-shunted first resistance element, a second resistance element and a capacitance element connected in series; means for applying said first signal voltage to said network; resistive connections for applying said second signal voltage across said capacitance element; and output connections respectively to the junction of said first and second resistance elements, and to the input terminal of said capacitance element which is common to both said signal-voltage-applying means.

3. A system for providing first and second output voltages whose alternating values are respectively functions of first and second input voltages and whose direct values are respectively functions of said second and first input voltages, comprising: first and second networks each comprising a capacitance-shunted first resistance element, a second resistance element and a capacitance element connected in series; means for applying said first and second input voltages respectively across said first and second networks; resistive connections between the junction of said second resistance element and said capacitance element of each said network, and the input terminal of said first resistance element of the other of said networks; and output connections respectively to the junctions of said first and second resistance elements of both said networks.

4. In a sweep circuit for oscilloscopes, a plurality of sweep amplifiers having grid electrodes, separate terminal means for impressing a sweep voltage upon each of said grids, means for maintaining said terminal means at a fixed potential at the start of each sweep cycle, said means comprising a normally conducting vacuum tube connected between each of said terminal means and a potential source and means for rendering said vacuum tubes non-conducting during each sweep cycle, and means interposed between said sweep amplifiers and said terminal means whereby said sweep amplifiers are interconnected in pairs in such a manner that the grid of the first amplifier in the pair is biased by a voltage which is a function of the average sweep voltage on the second amplifier and conversely.

5. In combination with an oscilloscope, a sweep circuit comprising a plurality of sweep amplifiers having grid electrodes, separate terminal means for impressing a sweep voltage upon each of said grids, means for maintaining said terminal means at a fixed potential at the start of each sweep cycle, said means comprising a normally conducting vacuum tube connected between each of said terminal means and a potential source and means for rendering said vacuum tubes non-conducting during each sweep cycle, and means interposed between said sweep amplifiers and said terminal means whereby said sweep amplifiers are interconnected in pairs in such a manner that the grid of the first amplifier in the pair is biased by a voltage which is a function of the average sweep voltage on the second amplifier and conversely.

6. In a sweep circuit, a plurality of terminal points for separately receiving a plurality of sweep voltages, separate means for maintaining said terminal points at a fixed potential at the start of a sweep cycle in each of said sweep voltages, said means comprising a normally conducting vacuum tube connected between each of said terminal means and a potential source and means for rendering said vacuum tubes non-conducting during each sweep cycle, a passive network interconnecting pairs of said terminals comprising a plurality of voltage dividers and filters, separate amplifying means for amplifying each of said sweep voltages appearing on the pair of terminals served by said passive network, and means for interconnecting said amplifying means and said passive network whereby one of the amplifiers served by a given passive network is automatically biased with a voltage which is a function of the sweep voltage impressed on the other amplifier so served and conversely.

7. A method for producing a sweep for oscilloscopes, comprising the steps of generating a plurality of saw-tooth sweep voltages, varying the conductivity of a vacuum tube to fix the potential of each of said voltages at a common value at the beginning of each sweep cycle, amplifying each of said sweep voltages electronically, and controlling the electronic amplification of a first of said sweep voltages with a biasing voltage produced from a second of said sweep voltages, which is proportional to the latter's average value and opposite in sign to the first sweep voltage.

8. A method for controlling the starting point of a radial sweep which comprises the steps of varying the conductivity of an individual vacuum tube to control the potential of four saw-tooth sweep voltages at the start of each sweep cycle, electrically amplifying two of the sweep voltages for vertical deflection and two for horizontal deflection, and controlling the operation of electronic amplification by biasing voltages whose values are automatically maintained as a function of the amplitude of the companion sweep voltage.

9. A method for biasing an electronic amplifier comprising the steps of generating a plurality of cyclic signal voltages of equal amplitude, varying the conductivity of a vacuum tube to control the potential of said signal voltages at the start of each signal cycle, electronically amplifying a first and a second of said signal voltages, and automatically controlling said electronic amplification of said first and second signal voltages by biasing voltages whose values are automatically maintained as a function of the amplitude respectively of said second and first signal voltages.

DAVID E. KENYON.

REFERENCES CITED

The following references are of record in the file of this patent:

UNITED STATES PATENTS

| Number | Name | Date |
| --- | --- | --- |
| 1,922,774 | Ryall | Feb. 26, 1935 |
| 2,089,430 | Rosy et al. | Aug. 10, 1937 |
| 2,154,386 | Schlesinger | Apr. 11, 1939 |
| 2,207,499 | Vance | July 9, 1940 |
| 2,265,848 | Lewis | Dec. 9, 1941 |
| 2,278,641 | Bond | Apr. 7, 1942 |
| 2,286,894 | Browne et al. | June 16, 1942 |
| 2,343,988 | Mahoney, Jr. | Mar. 14, 1944 |